United States Patent
Hahn

(10) Patent No.: US 7,713,131 B2
(45) Date of Patent: May 11, 2010

(54) DRIVE ASSEMBLY AND SLEEVE ASSEMBLY THEREFOR

(75) Inventor: Steven C. Hahn, Shelby Township, MI (US)

(73) Assignee: GKN Driveline North America, Inc., Auburn Hills, MI (US)

( * ) Notice: Subject to any disclaimer, the term of this patent is extended or adjusted under 35 U.S.C. 154(b) by 357 days.

(21) Appl. No.: 11/845,299

(22) Filed: Aug. 27, 2007

(65) Prior Publication Data

US 2009/0062019 A1    Mar. 5, 2009

(51) Int. Cl.
*F16D 3/06* (2006.01)

(52) U.S. Cl. .................. 464/162; 403/359.4

(58) Field of Classification Search .......... 464/162, 464/182; 403/322.2, 359.2–359.5, DIG. 6
See application file for complete search history.

(56) References Cited

U.S. PATENT DOCUMENTS

| | | | |
|---|---|---|---|
| 2,220,610 A * | 11/1940 | Miller | ............... 403/359.5 |
| 2,800,800 A | 7/1957 | Dunn | |
| 3,549,182 A | 12/1970 | Bogue et al. | |
| 3,945,268 A | 3/1976 | Ion et al. | |
| 4,106,311 A | 8/1978 | Euler | |
| 4,188,835 A | 2/1980 | Ion | |
| 4,318,630 A * | 3/1982 | Herchenbach et al. | ... 403/322.2 |
| 4,357,137 A | 11/1982 | Brown | |
| 4,406,641 A | 9/1983 | Mallet | |
| 4,705,491 A | 11/1987 | Andersson | |
| 4,911,034 A | 3/1990 | Kulczyk | |
| 5,460,574 A | 10/1995 | Hobaugh | |
| 5,595,540 A | 1/1997 | Rivin | |
| 5,630,758 A | 5/1997 | Rivin | |
| 5,645,366 A | 7/1997 | Ishibashi et al. | |
| 5,674,026 A | 10/1997 | Ishibashi et al. | |
| 5,725,430 A | 3/1998 | Barickman | |
| 6,200,225 B1 | 3/2001 | Hobaugh | |
| 6,220,415 B1 | 4/2001 | Cosenza | |
| 6,557,433 B1 | 5/2003 | Castellon | |

* cited by examiner

*Primary Examiner*—Greg Binda
(74) *Attorney, Agent, or Firm*—Jennifer M. Brumbaugh; Mick A. Nylander

(57) ABSTRACT

A sleeve assembly includes a sleeve having an inner surface with a first splined portion, and a biasing system biasing a rolling member through the first splined portion. A drive assembly includes the sleeve assembly and a shaft with a second splined portion engageable with the first splined portion of the shaft. When the sleeve assembly is coupled with the shaft to form the drive assembly, the biasing system biases the rolling member into engagement with the second splined portion of the shaft.

19 Claims, 3 Drawing Sheets

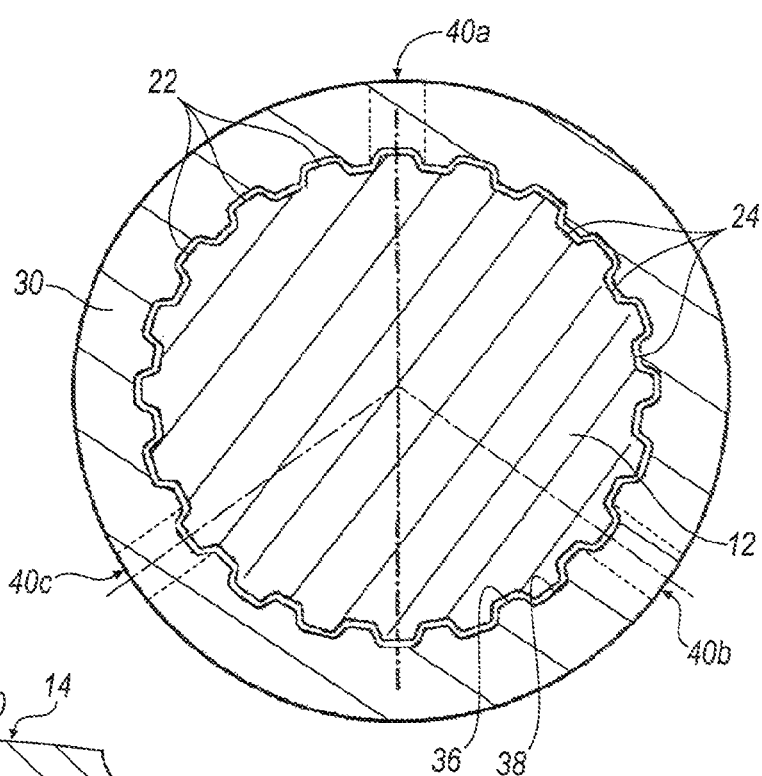
FIG. 6
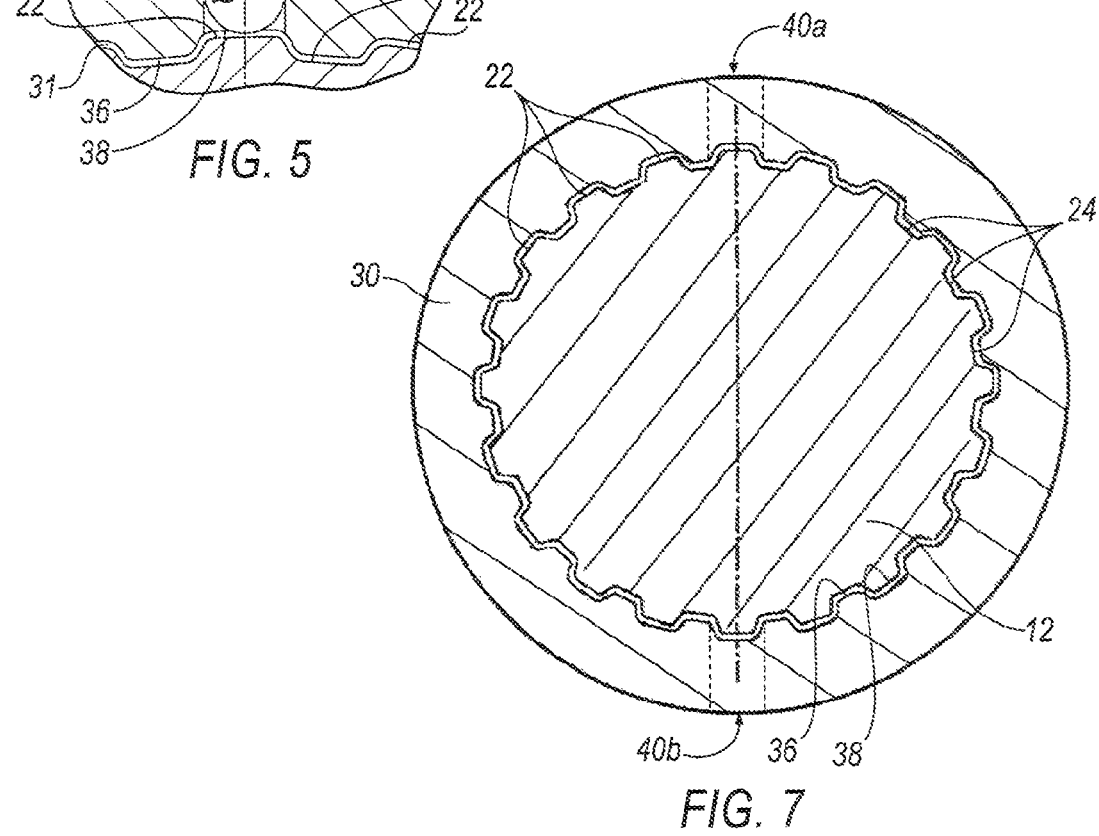
FIG. 5
FIG. 7

DRIVE ASSEMBLY AND SLEEVE ASSEMBLY THEREFOR

TECHNICAL FIELD

The present disclosure generally relates to drive systems of the type having a splined shaft engageable with a splined sleeve and more particularly to providing a preload feature for improved dynamic and balance characteristics.

BACKGROUND

Conventional driveline systems typically include shaft assemblies for delivering torque from a driving system, such as a motor or engine to a driven system, such as wheels or power equipment, which allows some relative axial movement between the driving and driven systems.

In a rear wheel drive motor vehicle, for example, a vehicle driveshaft or propeller shaft transmits torque from the transmission through a differential to the rear wheels of the vehicle, thereby causing the vehicle wheels to be desirably and selectively turned. The propeller shaft also dynamically compensates for the change or modification in the distance between the transmission and the differential that may occur when the vehicle is driven. Hence, the propeller shaft includes a portion or a member, which typically and telescopingly moves along the longitudinal axis of the propeller shaft in response to relative movement between the differential and the transmission, thereby allowing the propeller shaft to dynamically modify its length in response to the movement of the vehicle.

Such driveline systems often include an inner member or shaft having an outer surface with a splined portion and an outer member or sleeve having an inner surface with a splined portion. The splined portion of the shaft is capable of being slidably engaged in the splined portion of the sleeve to form a splined connection therebetween.

For a variety of reasons, primarily relating to the build up of tolerances between the shaft and sleeve, a mechanism must be provided for securing the sleeve and shaft together so that their splined portions will be snuggly engaged together. Furthermore, a build up of tolerances results in a partial misalignment of the rotational centers of gravity of the shaft and sleeve that must be compensated for by adding balancing weights to compensate for mass imbalance between the shaft and sleeve. Adding balancing weights increases both manufacturing time and cost.

In one known system, the removal of the slack between the sleeve and shaft can be accomplished by providing a radial preload between the shaft and sleeve to bias the splined portions into engagement. In such a system, the driveline assembly includes a spring disposed between a recessed portion of the male stub shaft and a splined portion of a female sleeve reacting between the male stub shaft and the female sleeve to apply a radial force on the male stub shaft to take up clearances between the two sets of splines.

While this solution provides for better engagement between the shaft and the sleeve, it has a significant shortcoming. The spring biases the sleeve and shaft system in a manner further displacing rotational centers of gravity, thereby requiring a significant amount of mass to dynamically balance the system. The additional mass adversely impacts efficiency.

Another known approach to engage the splined portions is to lengthen the shaft and sleeve so as to reduce the impact of the accumulation of tolerances. However, this arrangement adversely impacts both energy efficiency and space utilization.

Therefore, what is needed is a coupling system for a shaft assembly that will permit a more efficient coupling of a splined shaft with a spline sleeve.

SUMMARY

The present disclosure provides a drive assembly having a sleeve assembly and a shaft that may be inserted into the sleeve assembly. The sleeve assembly includes a sleeve having an inner surface with a first splined portion and biasing system biasing a rolling member through the first splined portion. The shaft has a second splined portion engageable with the first splined portion. When the sleeve assembly is connected with the shaft to form the drive assembly, the biasing system biases the rolling member into engagement with the splined portion of the splined shaft.

The present disclosure will be more fully understood upon reading the following detailed description of the various embodiments in conjunction with the accompanying drawings.

BRIEF DESCRIPTION OF THE DRAWINGS

Embodiments of the disclosure will now be described, by way of example, with reference to the accompanying drawings, wherein:

FIG. 5 is a cutaway portion of a sectional view taken along line 5-5 of FIG. 4;

FIG. 6 is a cutaway view of an exemplary embodiment of the drive assembly and the sleeve assembly taken along line 6-6 of FIG. 2 illustrating an exemplary embodiment wherein three biasing devices and rolling members are disposed in spaced radial positions about the sleeve; and FIG. 7 is a cutaway view of an alternative exemplary embodiment of the drive assembly and the sleeve assembly taken along line 6-6 of FIG. 2 wherein two biasing devices and rolling members are disposed in spaced radial positions about the sleeve.

DETAILED DESCRIPTION

Figure 1:
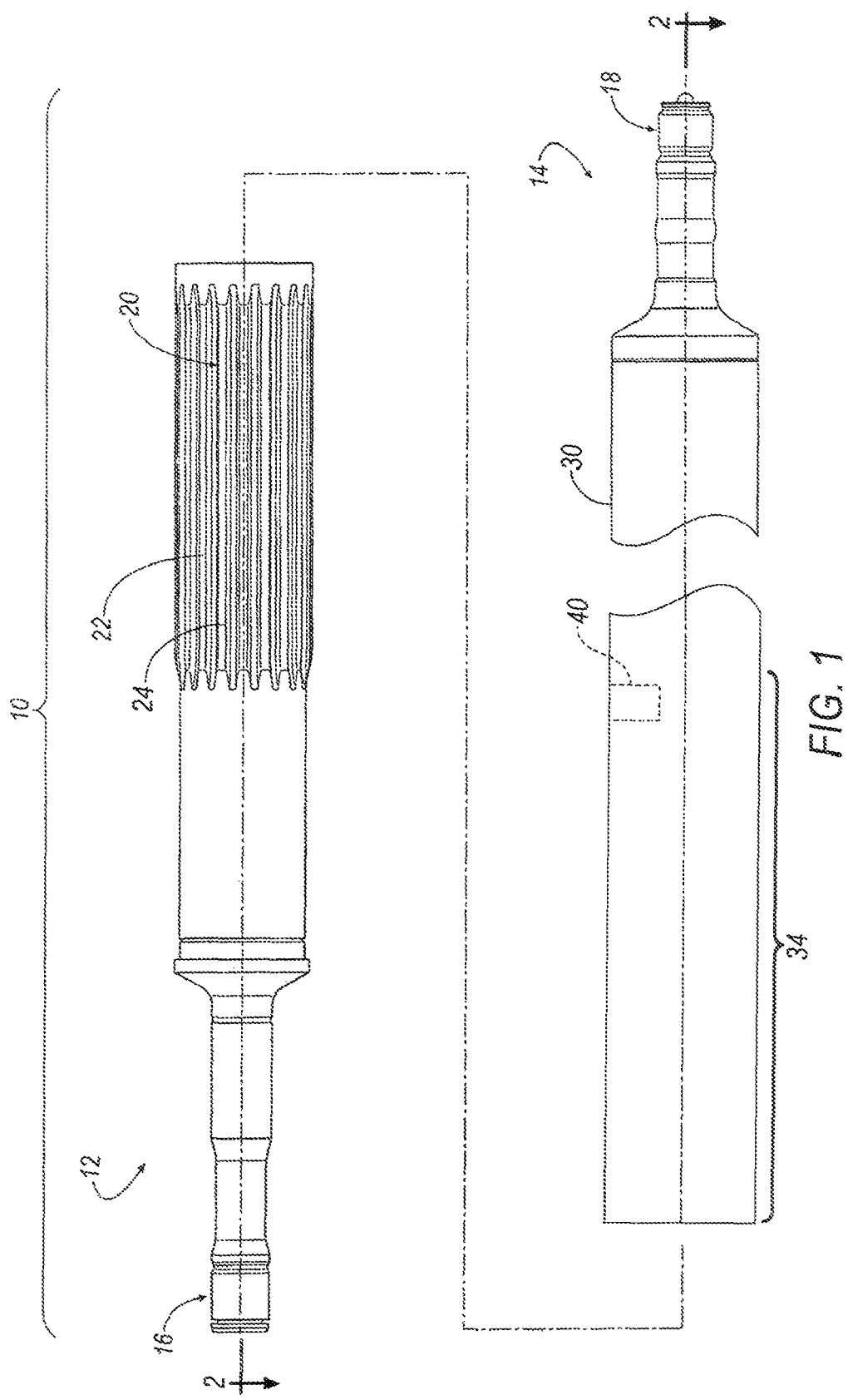
FIG. 1 is an exploded plan view of a slip spline drive assembly incorporating an exemplary embodiment of a drive assembly and a sleeve assembly.

Exemplary illustrations of a drive assembly and a sleeve assembly are described below. In the interest of clarity, not all features of an actual implementation are described in this specification. It will of course be appreciated that in the development of any such actual illustration, numerous implementation-specific decisions must be made to achieve the developers' specific goals, such as compliance with system-related and business-related constraints that will vary from one implementation to another. Moreover, it will be appreciated that such a development effort might be complex and time-consuming, but would nevertheless be a routine undertaking for those of ordinary skill in the art having the benefit of this disclosure.

Referring now to the drawings wherein like numerals indicate like or corresponding parts throughout the several views, exemplary embodiments are illustrated.

FIG. 1 illustrates an exemplary drive assembly 10 using a slip spline arrangement wherein a shaft 12 is coupled to a sleeve assembly 14. The shaft 12 may be solid, as shown in the drawing, or may be a hollow tubular member. As shown in FIG. 1, the shaft 12 and the sleeve assembly 14 include stub shaft portions 16 and 18 for connection to driving and driven systems (not shown). Alternatively, the stub shaft portions 16 and 18 could be replaced by a conventional flange or yoke arrangement.

It will be appreciated that the sleeve assembly 14 and the drive assembly 10 illustrated in FIG. 1 may be used advantageously with many types of drive systems where a slip spline arrangement is desirable. For example, the drive assembly 10 may be part of a vehicle propeller shaft assembly (not shown) that transmits torque from a transmission (not shown) through a differential to rear wheels of a vehicle (not shown), thereby causing the rear wheels to be desirably and selectively turned. Such propeller shafts typically use a splined connection to dynamically compensate for the change or modification in the distance between the transmission and the differential that may occur when the vehicle is driven.

Figure 2:
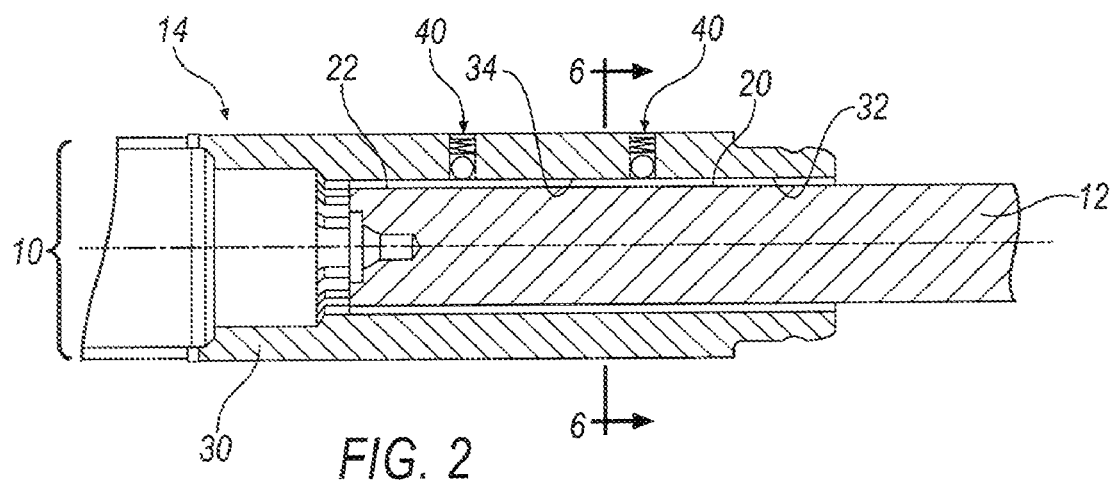
FIG. 2 is a cross-sectional view taken through line 2-2 of FIG. 1 illustrating details of a biasing device and a rolling member of the sleeve assembly engaging a splined portion of a shaft according an exemplary embodiment.

The shaft 12 is provided with a splined portion 20 that includes a plurality of outwardly projecting splines 22 and intermediate valleys 24 that are circumferentially formed on the shaft 12. Similarly, the sleeve assembly 14 includes a sleeve 30 having an opening 32 or channel (as best shown in FIG. 2) and a splined portion 34 with a plurality of internally projecting splines 36 and intermediate valleys 38 (as best shown in FIG. 5) that are circumferentially formed on an inner surface of the opening 32. The splines 22, 36 may be any shape, such as involute, flat-sided or top-fit as understood by one skilled in the art. This disclosure is not limited to the shape of splines illustrated in the accompanying figures.

When the shaft 12 is inserted into the opening 32 in the sleeve 30, the respective splined portions 22 and 34 cooperate to couple the shaft and sleeve into a torque transmission system. As best shown in FIGS. 5-7, when the shaft 12 is coupled with the sleeve 30, the outwardly projecting splines 22 of the shaft 12 form an outer diameter that is smaller than the inner diameter defined by the valleys 38 of the sleeve 30 such that a gap 31 is formed therebetween. Similarly, valleys 24 of the splined portion of the shaft 12 define an outer diameter that is smaller than inner diameter defined by the inwardly projecting splines 36 of the sleeve 30.

The number of splines 22 and 36 and their dimensions is application specific to ensure that the drive assembly 10 is capable of transmitting torque for the particular application. Thus, this disclosure is not limited to a specific number or configuration of the splines discussed herein. In many applications, however, including vehicle driveline applications, the respective splines 22 and 36 are proportioned in a manner to account for tolerance build up and to facilitate ease of assembly. In such applications, there will be a significant gap between the diameter of the valleys and the diameter of the splines which, if not corrected, may result in dynamic instability due to relative transverse movement of the components and misalignment of the dynamic centers of gravity of the components.

Figure 3:
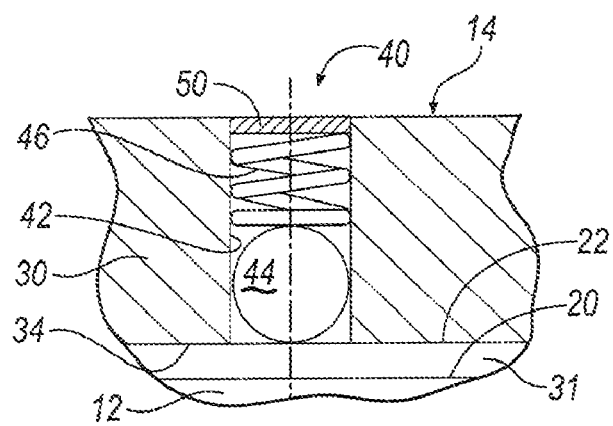
FIG. 3 is an enlarged cutaway view of a portion of FIG. 2 illustrating in detail an exemplary embodiment of a biasing device and a retaining member.

As illustrated in FIG. 3, the sleeve assembly 14 incorporates a biasing system 40 to compensate for this tolerance build up. In one embodiment, the biasing system 40 resides in a recess formed in the sleeve 30, such as a transverse bore 42. The biasing system includes a rolling member 44, which may be a sphere, such as a ball bearing, as shown. The biasing system further includes a biasing device such as a coil spring 46. The biasing device 46 acts against rolling member 44 to bias rolling member 44 into engagement with shaft 12. The rolling member 44 and biasing device 46 serves to exert a radial preload on the shaft 12, thereby reducing slack in a slip spline coupling without significantly increasing friction and wear or inhibiting desirable axial movement between the shaft 12 and sleeve 30.

Figure 4:
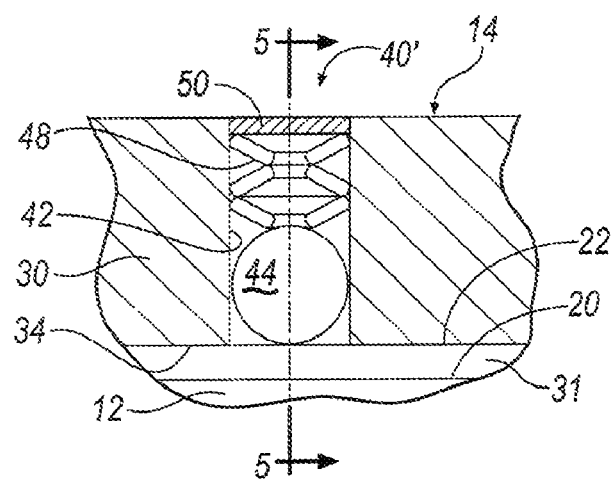
FIG. 4 is an enlarged cutaway view of a portion of FIG. 2 illustrating in detail an alternative exemplary embodiment of the biasing device and retaining member.

FIGS. 4 and 5 illustrate an alternative embodiment of a biasing system 40' to compensate for tolerance build up. Biasing system 40' incorporates a bevel washer spring 48 having one or more stacked bevel washers as an alternative biasing device. It will be appreciated that biasing systems 40 and 40' are representative of a variety of systems that may be advantageously used to bias a rolling member into engagement with the shaft 12 and that further references herein to the biasing system 40 include such alternative configurations.

As shown in FIGS. 3-5, in one embodiment, the transverse bore 42 is centered in a valley 38 of the splined portion 34 of the sleeve 30. In this configuration, the rolling member 44 will engage a surface of a spline 22 on the splined portion 20 of the shaft 12 and thereby provide a reliable engagement surface for rolling engagement between the rolling member 44 and the shaft 12. Additionally, the transverse bore 42 may be positioned at other locations of the splined portion 34 of the sleeve 30. For example, the bore 42 may be positioned in the spline 36 of splined portion 34 such that the rolling member 44 will engage the intermediate valley 24 of splined portion 20. The present disclosure is not limited to the transverse bore 42 location illustrated in the accompanying figures.

As shown in FIGS. 3-5, a retaining member 50, such as a plug, may also be provided to close the transverse bore 42. The biasing member 40, 40' reacts against the retaining member 50 to bias the rolling member 44 out of the transverse bore 42 into the gap 31 in the sleeve and into engagement with the shaft 12. The retaining member 50 facilitates assembly of the biasing system 40, 40'. The retaining member 50 may be selectively removable to facilitate later, selective access to the biasing system 40, 40' or the shaft 12, if needed. The retaining member 50 also inhibits entry of materials and contaminants to the interior of the drive assembly 10. However, it will be appreciated that a biasing system may alternatively be disposed in an integrally formed closed recess, not shown, and the biasing member could react against a portion of the sleeve directly instead of indirectly through the retaining member 50.

The sleeve assembly 14 may be provided with one or more axially spaced biasing systems 40, 40' to provide a radial preload at one or more locations. The use of more than one longitudinally spaced biasing systems 40, 40' (shown in FIG. 2) to exert a radial preload in two longitudinal locations along the drive assembly 10 will reduce slack in the assembly at more than one location. This arrangement may decrease tilting, wobbling and vibrations of the assembly that could otherwise occur remote from a single point of contact. The embodiment depicted in FIG. 2 will therefore reduce dynamic loading on the assembly and in some cases on components connected to the assembly. In some cases, the arrangement shown in FIG. 2 will permit reducing the length of the splined portions 20 and 34, respectively, of the shaft 12 and sleeve 30.

FIGS. 6 and 7 illustrate two alternative embodiments, whereby the sleeve assembly 14 may alternatively be provided with two or three angularly displaced biasing systems

40a, 40b and 40c to apply a radial preload in more than one direction to better align the rotational axes of the shaft 12 and sleeve 30. The use of at least two angularly spaced biasing systems 40 to exert a radial preload in two radial locations along the coupling will reduce the axial misalignment of the shaft 12 and the sleeve 30 since the radial force will be exerted on the shaft in opposing directions that will tend to center the shaft. This will decrease off balance conditions that could otherwise occur using a radial preload in only one direction from a single biasing system 40. This embodiment will therefore reduce the amount of compensating weight needed to offset the dynamic imbalance condition inherent in any rotating coupling. This will also, in some cases, permit reducing the length of the splined portions 20 and 34, respectively, of the shaft 12 and sleeve 30.

In the embodiment shown in FIG. 6, three biasing systems 40a, 40b, 40c are depicted equidistance from one another, along the perimeter of the shaft 12. In the embodiment shown in FIG. 7, a pair of biasing systems 40a, 40b are provided, along a central axis C-C that extends therebetween. It is understood, however, that the positioning depicted in the FIGS. shown herein is not limiting and that other alternative positioning of the biasing systems to apply a radial preload is contemplated.

It should further be noted that the various disclosed embodiments using multiple biasing systems may provide the stabilizing advantages described above independent of the use a rolling member 44 to engage the shaft. However, these systems are more practical and advantageous when used with the rolling member 44 to reduce friction since multiple biasing systems 40 would have multiple points of contact.

The present invention has been particularly shown and described with reference to the foregoing embodiments, which are merely illustrative of the best modes for carrying out the invention. It should be understood by those skilled in the art that various alternatives to the embodiments of the invention described herein may be employed in practicing the invention without departing from the spirit and scope of the invention as defined in the following claims. It is intended that the following claims define the scope of the invention and that the method and apparatus within the scope of these claims and their equivalents be covered thereby. This description of the invention should be understood to include all novel and non-obvious combinations of elements described herein, and claims may be presented in this or a later application to any novel and non-obvious combination of these elements. Moreover, the foregoing embodiments are illustrative, and no single feature or element is essential to all possible combinations that may be claimed in this or a later application.

What is claimed is:

1. A drive assembly comprising:
a male propeller shaft having an outer surface with a first splined portion; and
a sleeve assembly comprising:
a female propeller shaft sleeve having an inner surface with a second splined portion, wherein the first splined portion is placed into engagement with the second splined portion;
a rolling member disposed at least partially in the sleeve and in rolling contact with the first splined portion, when the shaft is placed in engagement with the sleeve assembly; and
a biasing device recessed at least partially within a sleeve aperture, wherein the biasing device biases the rolling member against a portion of the shaft when the shaft is placed into engagement with the sleeve.

2. The drive assembly of claim 1, wherein the recess is a transverse hole extending through the sleeve.

3. The drive assembly of claim 2, wherein the transverse hole is closed by a retaining member and the biasing device reacts between the rolling member and the retaining member.

4. The drive assembly of claim 2, wherein the retaining member is selectively removable.

5. The drive assembly of claim 1, wherein the rolling member is a sphere.

6. The drive assembly of claim 1, wherein the sleeve assembly further comprises at least two rolling members and at least two biasing devices, each of the biasing devices biasing one of the at least two biasing members against the shaft.

7. The drive assembly of claim 6, wherein the at least two rolling members are displaced longitudinally from each other along the length of the first splined portion.

8. The drive assembly of claim 6, wherein the at least two rolling members are displaced angularly from each other about the first splined portion of the shaft.

9. The drive assembly of claim 8, wherein the at least two rolling members are equally spaced around the first splined portion of the shaft.

10. The drive assembly of claim 1, wherein the rolling member engages a spline on the first splined portion of the shaft.

11. A drive assembly, said assembly comprising:
a propeller shaft having an outer surface with a first splined portion defining first mating splines;
a propeller sleeve assembly comprising:
a sleeve having a longitudinal channel in the sleeve configured to receive the shaft therein; an inner surface with a second splined portion defining second mating splines in the channel placed in splined engagement with the first mating splines;
a transverse hole extending into the channel;
a rolling member disposed partially in the transverse hole and disposed in rolling contact with the first splined portion when the first mating splines are in splined engagement with the second mating splines; and
a biasing device disposed at least partly in the transverse hole and biasing the rolling member against the shaft, wherein the biasing member is directly supported by the rolling member on a first end and a bottom surface of the transverse hole at an opposite end.

12. The drive assembly of claim 11 wherein the transverse hole extends through the sleeve and is closed by a retaining member and further wherein the biasing device reacts between the rolling member and the retaining member to bias the rolling element against the shaft.

13. The drive assembly of claim 11 comprising at least two rolling members and at least two biasing devices, each of the biasing devices biasing one of the at least two rolling members against the first splined portion.

14. The drive assembly of claim 13 wherein the at least two rolling members are displaced longitudinally from each other along the length of the first splined portion.

15. The drive assembly of claim 13 wherein the at least two rolling members are displaced angularly from each other about the first splined portion.

16. A sleeve assembly for a drive system, said sleeve assembly comprising:
a sleeve having:
a longitudinal channel;
an inner surface;
a splined portion disposed on the inner surface defining longitudinally extending splines alternating with longitudinally extending valleys therebetween;

a transverse hole through the sleeve extending into the channel through one of the longitudinally extending valleys;

a rolling member disposed partially in the transverse hole and extending partially into the one of the longitudinally extending valleys;

a retaining member disposed at least partly into the transverse hole; and a biasing device disposed in the transverse hole and positioned to react against the retaining member to bias the rolling member outwardly from the transverse hole into the one of the longitudinally extending valleys.

17. The sleeve assembly of claim 16 further comprising:

a second transverse hole extending through the sleeve and into the channel through the splined portion;

a second rolling member disposed partially in the second transverse hole and extending partially into one of the longitudinally extending valleys;

a second retaining member disposed at least partly into the second transverse hole; and a second biasing device disposed in the second transverse hole and positioned to react against the second retaining member to bias the second rolling member outwardly from the second transverse hole into the channel.

18. The sleeve assembly of claim 17 wherein the transverse holes extend into the same longitudinally extending valley and are displaced longitudinally from each other along the length of the splined portion.

19. The sleeve assembly of claim 17 wherein the transverse holes extend into different longitudinally extending valleys and are displaced angularly from each other about the splined portion.

* * * * *